(12) United States Patent
Yamaguchi

(10) Patent No.: US 7,518,115 B2
(45) Date of Patent: Apr. 14, 2009

(54) RADIATION IMAGE DETECTOR

(75) Inventor: Akira Yamaguchi, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 741 days.

(21) Appl. No.: 11/236,590

(22) Filed: Sep. 28, 2005

(65) Prior Publication Data
US 2006/0065845 A1 Mar. 30, 2006

(30) Foreign Application Priority Data
Sep. 30, 2004 (JP) ............................. 2004-287317

(51) Int. Cl.
*H01L 27/00* (2006.01)
(52) U.S. Cl. .................. 250/370.09; 250/580
(58) Field of Classification Search ............ 250/370.09, 250/580
See application file for complete search history.

(56) References Cited
U.S. PATENT DOCUMENTS
4,862,237 A * 8/1989 Morozumi .................. 257/72

2004/0056204 A1 3/2004 Tanaka et al.

\* cited by examiner

*Primary Examiner*—David P Porta
*Assistant Examiner*—Marcus H Taningco
(74) *Attorney, Agent, or Firm*—Sughrue Mion, PLLC

(57) ABSTRACT

A TFT readout system radiation image detector capable of satisfactorily removing noise signals generated by the parasitic capacitors formed in the vicinity of the respective intersections between gate control signal lines and charge signal lines with a simple and inexpensive circuit configuration. The detector includes charge detecting elements for storing charges generated by receiving radiation; gate control signal lines through which a gate control signal flows to control the switching element of each charge detecting element; charge signal lines to which charge signals stored in the storage sections flow out; and dummy signal lines, each being installed adjacent to each of the corresponding charge signal lines. The dummy signal flowed out to each dummy signal line is subtracted from the signal flowed out to each charge signal line when the gate signal is flowed through the gate control signal line by the differential amplifier.

3 Claims, 3 Drawing Sheets

RADIATION IMAGE DETECTOR

BACKGROUND OF THE INVENTION

1. Field of the Invention

The present invention relates to a radiation image detector in which charges of a radiation image are generated and stored by receiving radiation carrying the radiation image, and the charges stored in the detector are detected as image signals.

2. Description of the Related Art

Various types of radiation image detectors are proposed and put into practical use in the medical and other industrial fields. In such a detector, a radiation image of a subject is recorded by receiving radiation transmitted through the subject, and the image recorded on the detector is detected by reading out the image signals in accordance with the image recorded on the detector.

Some of the radiation image detectors use, for example, a semiconductor material that generates charges when exposed to radiation, and some of them use a so-called TFT readout system.

One such TFT readout system radiation image detector includes, for example, a radiation image recording medium, which is a layer composite of a charge generating layer for generating charges by receiving radiation, and a charge detecting layer for storing the charges generated in the charge generating layer; and a detecting section having charge amplifiers for detecting charge signals flowed out from the radiation image recording medium and the like.

More specifically, the charge detecting layer of the radiation image recording medium includes multitudes of charge detecting elements disposed two-dimensionally in orthogonal directions, each having a storage section for storing the charge generated in the charge generating layer and a TFT switching element. The charge detecting layer further includes multitudes of charge signal lines, each being installed in parallel with each column of the charge detecting elements; and multitudes of gate control signal lines, each being installed in parallel with each row of the charge detecting elements and orthogonally to each of the charge signal lines.

When recording a radiation image using the radiation image detector constructed in the manner as described above, the radiation image is recorded by irradiating radiation carrying the image on the charge generating layer, and storing the charges generated in the charge generating layer in the storage sections of the charge detecting layer. When reading out the radiation image, a gate control signal is outputted to the gate control signal lines selectively from a gate driver, and the TFT switching elements of the charge detecting elements connected to the gate control signal line are switched to ON according to the gate control signal, and charge signals start to flow out to the charge signal lines from the storage sections of the activated charge detecting elements. The charge signals flowed out to the charge signal lines are detected as image signals through charge amplifiers and the like. In this way, the radiation image is read out.

Here, in the radiation image detector described above, the gate control signal lines and charge signal lines are disposed orthogonally to each other with an insulation layer between them. Consequently, a parasitic capacitor is formed between each of the gate control signal lines and each of the charge signal lines in the vicinity of the intersection. When the gate control signal flows through one of the gate control signal lines in the reading process for reading out the radiation image as described above, a potential difference is developed between the gate control signal line and each of the charge signal lines, and charges are stored in the parasitic capacitors. Then the charges stored in the parasitic capacitors flow out to the charge signal lines as noise signals and included in the charge signals flowed out from the storage sections of the charge detecting elements.

Under the circumstances described above, one method for eliminating the noise signals is proposed as described, for example, in U.S. patent application Publication No. 20040056204. In the method, noise compensation signal lines are provided orthogonally to the charge signal lines with an insulation layer between them, in addition to the gate control signal lines. Further, TFT switching elements, each connected to each of the noise compensation signal lines and each of the charge signal lines, and dummy capacitors, each connected to each of the TFT switching elements are also provided. When outputting the gate control signal to one of the gate control signal lines, a signal having an opposite polarity to that of the gate control signal is also outputted to the corresponding noise compensation signal line to generate a noise compensation signal in the vicinity of each intersection between each of the charge signal lines and the noise compensation signal line in accordance with the reverse polarity signal, and store it in each of the dummy capacitors, then the noise compensation signals stored in the dummy capacitors are outputted to the charge signal lines through the TFT switching elements to eliminate the noise signals.

However, each of the noise compensation signal lines described in U.S. patent application Publication No. 20040056204 is installed in a place which is different from the place where each of the gate control signal lines is installed. The insulation layer installed between the gate control signal lines and charge signal lines, and that installed between the noise compensation signal lines and charge signal lines have different thickness variations with each other. Consequently, each parasitic capacitor formed in the vicinity of the intersection between each of the gate control signal lines and each of the charge signal lines, and that formed in the vicinity of the intersection between each of the noise compensation signal lines and each of the charge signal lines may differ in the capacitance value. Accordingly, the noise signals and noise compensation signals may differ in magnitude and the noise may not be eliminated properly, resulting in the residual noise being included in the charge signals. Further, it requires a separate gate driver for outputting the reverse polarity signal to the noise compensation signal lines, causing the circuit to be more complicated and resulting in higher costs.

SUMMARY OF THE INVENTION

In view of the circumstances described above, it is an object of the present invention to provide a TFT readout system radiation image detector capable of satisfactorily eliminating the noise signals generated by the parasitic capacitances with a simple and inexpensive circuit configuration.

The radiation image detector of the present invention comprises:

(a) a radiation image recording medium, including:

(1) a charge generating section for generating charges by receiving radiation carrying a radiation image;

(2) multitudes of charge detecting elements disposed two-dimensionally in orthogonal directions, each having a storage section for storing the charge generated in the charge generating section, and a switching element for reading out the charge signal stored in the storage section;

(3) multitudes of charge signal lines for receiving the charge signals flowing out from the storage sections, each of the charge signal lines being installed in parallel with each column of the charge detecting elements disposed in either direction of the orthogonal directions;

(4) multitudes of gate control signal lines for receiving a gate control signal for controlling the switching elements ON and OFF, each of the gate control signal lines being installed in parallel with each row of the charge detecting elements disposed in the other direction of the orthogonal directions; and (b) a detecting section for detecting the charge signals flowed out to the charge signal lines of the radiation image recording medium, wherein:

the radiation image recording medium further includes multitudes of dummy signal lines, each being installed adjacent to each of the corresponding charge signal lines in parallel; and the detecting section includes a subtracting means for subtracting each of the dummy signals flowed out to each of the dummy signal lines installed adjacent to each of the corresponding charge signal lines from each of the charge signals flowed out to each of the charge signal lines when the gate control signal is flowed through the gate control signal lines.

The detecting section may include multitudes of differential amplifiers as the subtracting means, and each of the charge signal lines and each of the dummy signal lines installed adjacent to each of the corresponding charge signal lines may be connected to each of the corresponding differential amplifiers.

Further, a charge amplifier may be used as the differential amplifier, in which each charge signal line and each corresponding dummy signal line are connected to the inverting input terminal and non-inverting input terminal of the charge amplifier respectively. In addition, the non-inverting terminal may be grounded through a capacitor having a capacitance value which is equal to the feedback capacitance of the charge amplifier.

Here, the referent of "each of the charge signals flowed out to each of the charge signal lines when the gate control signal is flowed through the gate control signal lines" means not only each of the charge signals stored in the storage section of each of the charge detecting elements but also includes a noise signal accumulated in each of the parasitic capacitors formed in the vicinity of the intersection between each of the gate control signal lines and each of the charge signal lines, and flowed out to each of the charge signal lines.

Further, the referent of "column" and "row" are used for distinguishing the two orthogonal directions, and they do not necessarily mean a particular direction, such as the horizontal or vertical direction.

According to the radiation image detector of the present invention, multitudes of dummy signal lines are provided, each being installed adjacent to each of the corresponding charge signal lines of the radiation image recording medium. This allows the capacitance value of each of the parasitic capacitors formed in the vicinity of the intersection between each of the gate control signal lines and each of the charge signal lines, and that of the corresponding parasitic capacitor formed in the vicinity of the intersection between each of the gate control signal lines and each of the dummy signal lines to be substantially equal to each other. In addition, each of the dummy signals flowed out to each of the dummy signal lines is subtracted from each of the corresponding charge signals flowed out to each of the charge signal lines, so that the noise signals generated by the parasitic capacitors formed in the vicinity of the respective intersections between the gate control signal lines and charge signal lines may be eliminated satisfactorily.

Further, all that is additionally required is the dummy signal lines described above, so that the noise signals may be eliminated by a simpler and more inexpensive circuit configuration compared with the case where an additional gate driver is provided separately.

DESCRIPTION OF THE PREFERRED EMBODIMENTS

Hereinafter, an embodiment of the radiation image detector of the present invention will be described with reference to the accompanying drawings.

Figure 1:
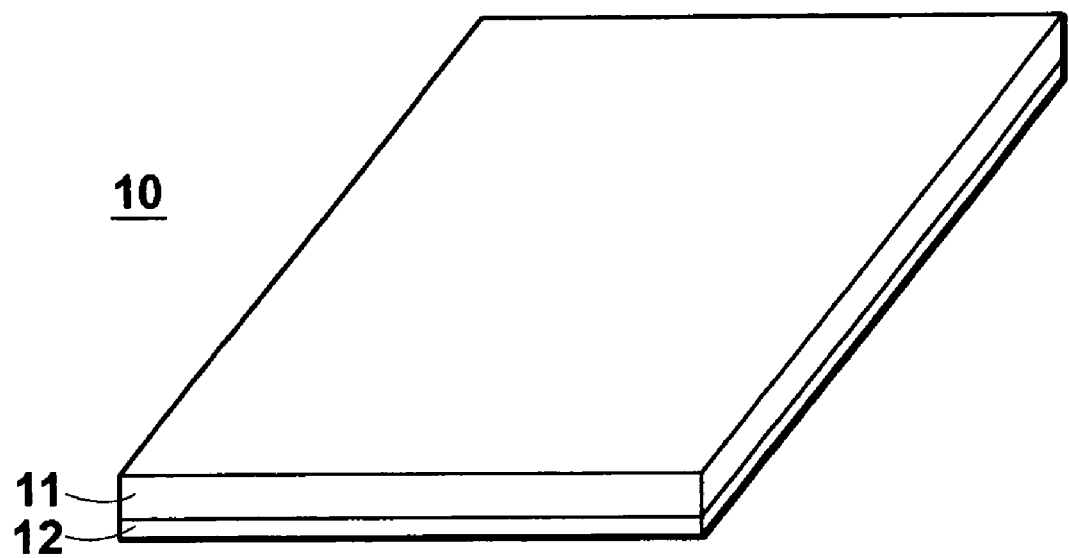
FIG. 1 is a perspective view of the radiation image recording medium according to an embodiment of the radiation image detector of the present invention.

The radiation image detector according to the present embodiment includes a radiation image recording medium 10 having a charge generating layer 11 for generating charges by receiving radiation, and a charge detecting layer 12 for storing the charges generated in the charge generating layer 11 as shown in FIG. 1; and a detecting section 20, which will be described later, for detecting charge signals flowed out from the radiation image recording medium 10.

The charge generating layer 11 may be made of any material as long as it is capable of generating charges when exposed to radiation. Preferably, however, it is made of, for example, a-Se or the like which has high quantum efficiency and a less amount of dark current. Alternatively, the charge generating layer 11 may be a two-layer composite of a phosphor layer that emits fluorescent light when exposed to radiation, and a photoconductive layer that generates charges when exposed to the fluorescent light emitted from the phosphor layer.

Figure 2:
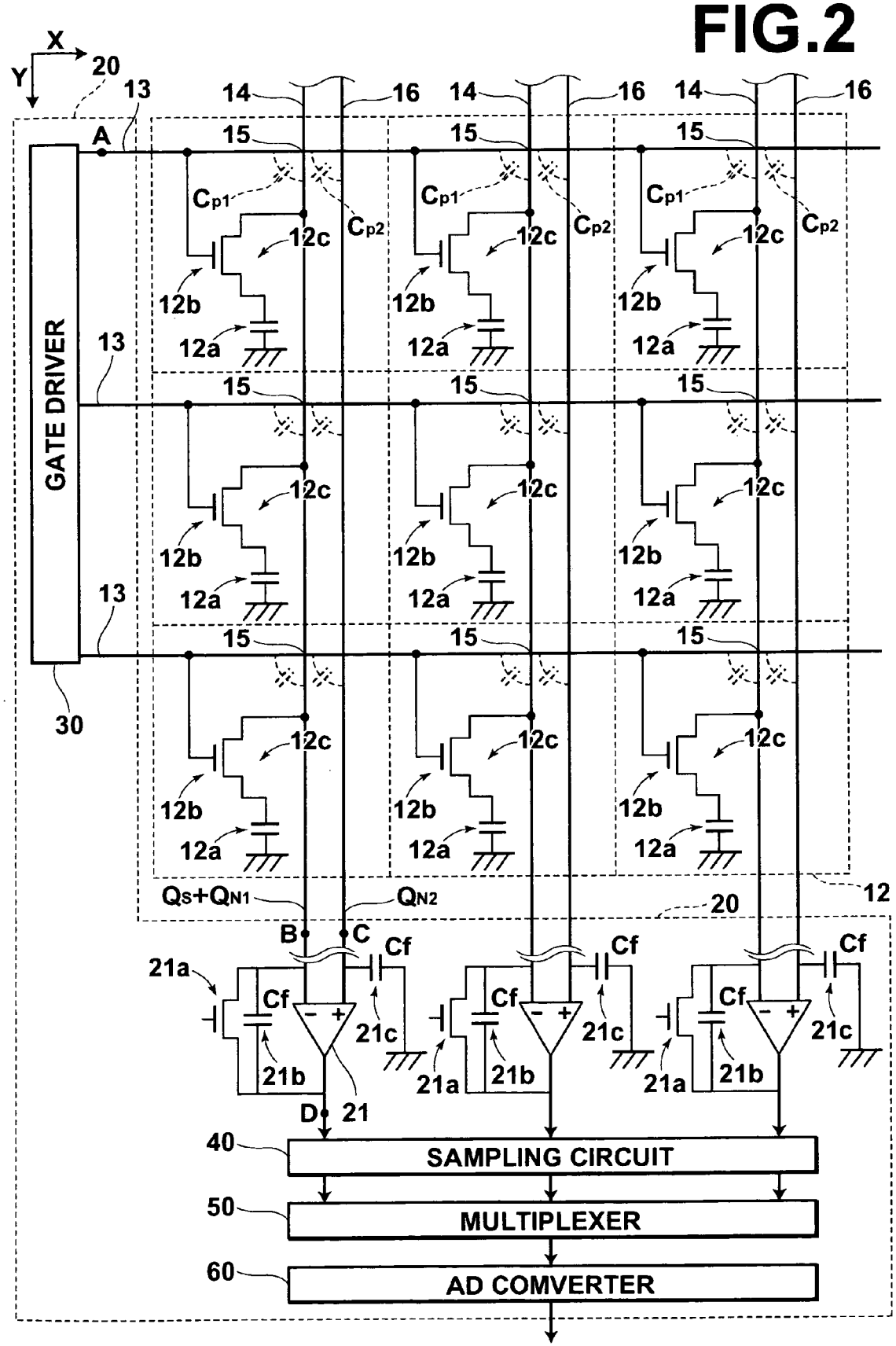
FIG. 2 is a schematic diagram of the detecting section and the charge detecting layer of the radiation image recording medium according to an embodiment of the radiation image detector of the present invention, illustrating the configuration thereof.

More specifically, the charge detecting section 12 includes multitudes of charge detecting elements 12c disposed two-dimensionally in the orthogonal directions, each having a storage section 12a for storing the charge generated in the charge generating layer 11, and a switching element 12b for reading out the charge stored in the storage section 12a as shown in FIG. 2. The storage section 12a is a capacitor and the switching element 12b is a TFT switch.

As shown in FIG. 2, the charge detecting layer 12 further includes multitudes of gate control signal lines 13, each installed in parallel with each row of the charge detecting elements disposed in X direction, and multitudes of charge signal lines 14, each installed in parallel with each column of the charge detecting elements disposed in Y direction. A gate control signal flows through each of the gate control signal lines 13 to cause the switching elements 12b connected thereto to be switched to ON or off. Each of the charge signal lines 14 receives the charge signals stored in and flowed out from the storage sections 12a connected thereto. The gate control signal is outputted from a gate driver to be described later.

Figure 3:
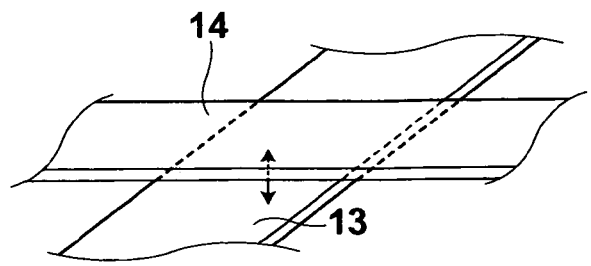
FIG. 3 is a drawing for explaining the arrangement of the gate control signal line and charge signal line.

Each of the gate control signal lines and each of the charge signal lines are installed orthogonally without contacting with each other at the intersection 15. As shown in FIG. 3, a predetermined spacing is provided between them, in which an insulation layer is installed.

Here, the radiation image recording medium 10 according to the present embodiment further includes multitudes of dummy signal lines 16, each being installed adjacent to each of the corresponding charge signal lines 14 in parallel. Each of the dummy signal lines 16 is disposed orthogonally to each of the gate control signal lines 13, as is each of the charge signal lines 14, without contacting with each other at the intersections. Instead, a predetermined spacing is provided between them, in which an insulation layer is installed. Preferably, each of the dummy signal lines 16 is installed within the pixel range of the adjacent charge signal line 14. The pixel range as used herein means each rectangular region defined by the dotted lines for each of the charge detecting elements 12c as shown in FIG. 2. The operation of the dummy signal lines will be described later.

The detecting section 20 includes multitudes of differential amplifiers 21, a gate driver 30, a sampling circuit 40, a multiplexer 50, and an AD converter 60.

Each of the differential amplifiers 21 is connected to each of the corresponding charge signal lines 14 and each of the adjacently disposed dummy signal lines. The differential amplifier 21 is a charge amplifier having a reset switch 21a, and an integration capacitor 21b. The charge signal line is connected to the inverting terminal (−), and the dummy signal line is connected to the non-inverting terminal (+) of the differential amplifier 21. Further, the non-inverting terminal of the differential amplifier 21 is grounded through a gain adjusting capacitor 21c having the same capacitance value Cf as the feedback capacitance value Cf of the integration capacitor 21b of the differential amplifier 21. The function of the gain adjusting capacitor will be described later.

The gate driver 30 outputs the gate control signal to each of the gate control signal lines 13 of the radiation image recording medium 10 selectively and sequentially.

The sampling circuit 40 samples the signals outputted from each of the differential amplifiers 21 at predetermined timings, that is, it performs what is known as the correlated double sampling. The operation of the circuit 40 will be described later.

The multiplexer 50 selectively switches analog image signals outputted from the sampling circuit 40 to output them to the AD converter 60.

The AD converter 60 converts the analog image signals outputted from the multiplexer 50 to digital image signals.

Hereinafter, radiation image recording and reading processes by the radiation image detector according to the present embodiment will be described.

When recording a radiation image using the radiation image detector according to the present embodiment, initially, radiation rays transmitted through a subject is irradiated on the detector from the side of the charge generating layer 11 of the radiation image recording medium 10. Then, charge amounts are generated in the charge generating layer 11 in proportion to the amounts of radiation irradiated thereon, which are then stored in the storage sections 12a of the charge detecting layer 12. In this way, the radiation image is stored and recorded.

Figure 4:
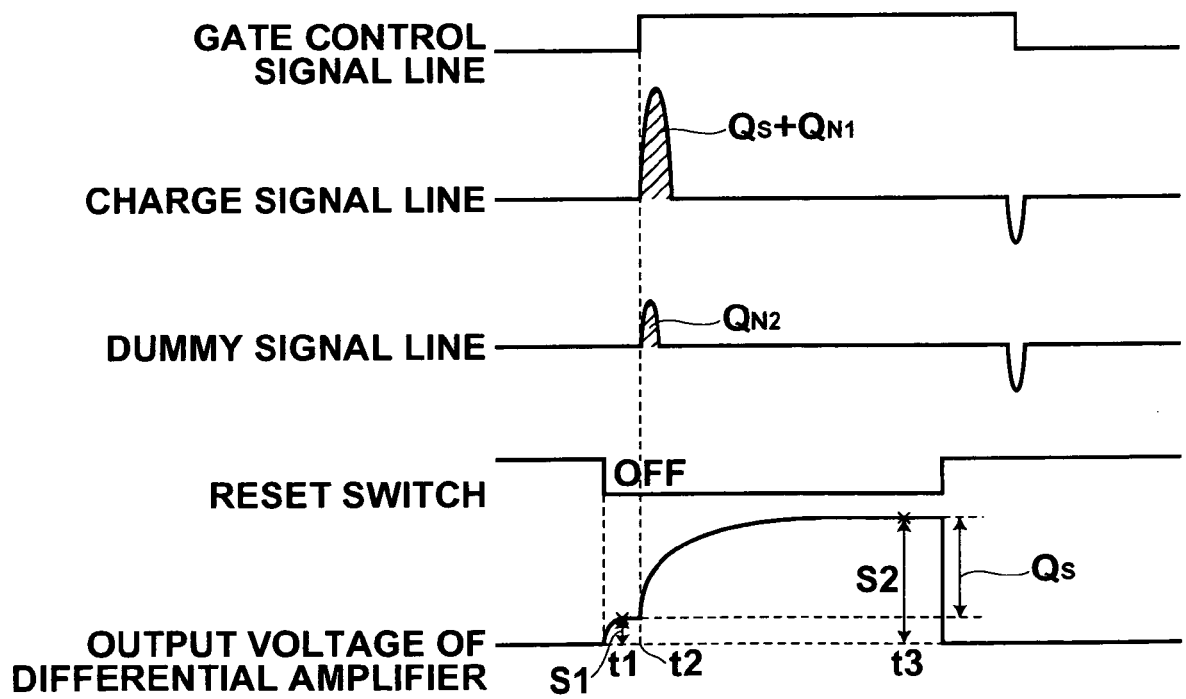
FIG. 4 is a timing chart for explaining the operation of the radiation image detector according to an embodiment of the present invention.

Hereinafter, the reading process for reading out the radiation image stored and recorded in the manner as described above will be described with reference to a timing chart shown in FIG. 4. In FIG. 4, the voltage waveform on the gate control signal line is the voltage waveform at point A, and that on the charge signal line is the voltage waveform at point B in FIG. 2 respectively. The voltage waveform on the dummy signal line is the voltage waveform at point C, and that of the output voltage of the differential amplifier is the voltage waveform at point D in FIG. 2 respectively.

When reading out the radiation image from the radiation image detector, initially, the reset switch 21a of each of the differential amplifiers 21 is switched to OFF to initiate the integration as illustrated in the timing chart shown in FIG. 4. Then, at the time point t1, which is right after the reset switch is switched to OFF, output voltages S1 outputted from the respective differential amplifiers 21 are sampled by the sampling circuit 40. At the time point t2, which is right after the time point t1, the gate control signal for causing the switching elements 12b to be switched to ON is outputted to one of the gate control signal lines 13 from the gate driver 30. Then, the switching element 12b of each of the charge detecting elements 12c connected to the gate control signal line 13 is switched to ON in response to the gate control signal, and the charge signals $Q_S$ stored in the storage sections 12a of the charge detecting elements 12c are outputted to the respective charge signal lines 14 connected to the respective storage sections 12a.

Here, when the gate control signal is outputted to one of the gate control signal lines 13 from the gate driver 30 as described above, a noise signal $Q_{N1}$ flows out to each of the charge signal lines 14 from each of the parasitic capacitors $C_{P1}$ formed in the vicinity of the intersection 15 between the gate control signal line 13 and each of the charge signal lines 14, as well as the charge signal $Q_S$ from the storage section 12a. That is, the composite signal of the charge signal $Q_S$ and noise signal $Q_{N1}$ flows out to each of the charge signal lines 14. In particular, the noise signal $Q_{N1}$ becomes comparatively large when compared with the charge signal $Q_S$ from a low radiation area, which needs to be eliminated in order to obtain an acceptable image signal.

In the radiation image detector according to the present embodiment, dummy signal lines 16 are provided in order to eliminate the noise signals $Q_{N1}$. That is, when the gate control signal is outputted to one of the gate control signal lines 13 from the gate driver 30, a dummy signal $Q_{N2}$ also flows out simultaneously to each of the dummy signal lines 16 from each of the parasitic capacitors $C_{P2}$ formed in the vicinity of the intersection between the gate control signal line 13 and each of the dummy signal lines 16.

In the radiation image detector according to the present embodiment, each of the dummy signal lines 16 is installed adjacent to each of the corresponding charge signal lines 14, so that the thickness of the insulation layer is substantially the same in the vicinity of each intersection between each of the charge signal lines 14 and each of the gate control signal lines 13, and in the vicinity of each intersection between each of the dummy signal lines 16 and each of the gate control signal lines 13. Thus, each of the parasitic capacitors $C_{P1}$ and each of the corresponding parasitic capacitors $C_{P2}$ may have substantially the same capacitance value. Consequently, the dummy signal $Q_{N2}$ which is substantially the same in amount as the noise signal $Q_{N1}$ may be flowed through each of the dummy signal lines 16.

Then, each of the composite signals of $Q_S+Q_{N1}$ flowed out to each of the charge signal lines is inputted to each of the corresponding differential amplifiers 21 from the inverting input terminal, and each of the dummy signals $Q_{N2}$ flowed out to each of the corresponding dummy signal lines 16 is inputted thereto from the non-inverting input terminal, where the dummy signal $Q_{N2}$ is subtracted from the composite signal of $Q_S+Q_{N1}$ to eliminate the noise signal $Q_{N1}$.

For each of the parasitic capacitors $C_{P1}$ and each of the corresponding parasitic capacitors $C_{P2}$ to have substantially the same capacitance value, the intersection between the charge signal line 14 and gate control signal line 13, and that between the dummy signal line 16 and gate control signal line 13 need to have substantially the same area.

In the differential amplifier 21, the gain adjusting capacitor 21c is provided for the dummy signal line 16, so that the high frequency gain characteristics are compensated. Consequently, a pulse noise signal $Q_{N1}$ may be eliminated by a pulse dummy signal $Q_{N2}$.

Thereafter, the charge signal $Q_S$ with the noise signal $Q_{N1}$ being eliminated in the manner as described above is integrated by the differential amplifier 21. At the time point t3 which is just before the end of a predetermined integration time, the output voltages S2 of the respective differential amplifiers 21 are sampled by the sampling circuit 40.

Then, the reset switch 21a of each of the differential amplifiers 21 is switched to ON right after the sampling. Thereafter, the gate control signal for causing the switching elements 12b to be switched to OFF is outputted to the gate control signal line 13 from the gate driver 30, and each of the switching elements 12b is switched to OFF in response to the gate control signal.

Then, in the sampling circuit 40, the output voltage S1 is subtracted from the output voltage S2 sampled in the manner as described above, and the resultant voltage is obtained as an analog image signal. Then, each of the differential amplifiers 21 is switched by the multiplexer 50 to input the analog image signals obtained in the manner as described above to the AD converter, where they are sequentially digitized and outputted as digital image signals.

Thereafter, the gate control signal is outputted from the gate driver 30 to the gate control signal lines 13 selectively and sequentially, and the reading process described above is repeated until digital image signals for the entire radiation image recording medium 10 is obtained.

In the radiation image detector according to the present embodiment, each dummy signal $Q_{N2}$ is subtracted from each composite signal of $Q_S+Q_{N1}$ by connecting each charge signal line 14 and each corresponding dummy signal line 16 to a single differential amplifier 21. But the radiation image detector of the present invention is not limited to this, and other circuit configurations known in the art may be used for subtracting the dummy signal $Q_{N2}$ from the composite signal of $Q_S+Q_{N1}$.

What is claimed is:

1. A radiation image detector, comprising:
    (a) a radiation image recording medium, including:
        (1) a charge generating section for generating charges by receiving radiation carrying a radiation image;
        (2) multitudes of charge detecting elements disposed two-dimensionally in orthogonal directions, each having a storage section for storing the charge generated in the charge generating section, and a switching element for reading out the charge signal stored in the storage section;
        (3) multitudes of charge signal lines for receiving the charge signals flowing out from the storage sections, each of the charge signal lines being installed in parallel with each column of the charge detecting elements disposed in either direction of the orthogonal directions;
        (4) multitudes of gate control signal lines for receiving a gate control signal for controlling the switching elements ON and OFF, each of the gate control signal lines being installed in parallel with each row of the charge detecting elements disposed in the other direction of the orthogonal directions; and
    (b) a detecting section for detecting the charge signals flowed out to the charge signal lines of the radiation image recording medium,
wherein:
    the radiation image recording medium further includes multitudes of dummy signal lines, each being installed adjacent to each of the corresponding charge signal lines in parallel; and
    the detecting section includes a subtracting means for subtracting each of the dummy signals flowed out to each of the dummy signal lines installed adjacent to each of the corresponding charge signal lines from each of the charge signals flowed out to each of the charge signal lines when the gate control signal is flowed through the gate control signal lines.

2. The radiation image detector according to claim 1, wherein the detecting section includes multitudes of differential amplifiers as the subtracting means; and each of the charge signal lines and each of the dummy signal lines installed adjacent to each of the corresponding charge signal lines are connected to each of the corresponding differential amplifiers.

3. The radiation image detector according to claim 2, wherein the differential amplifier is a charge amplifier; and each charge signal line and each corresponding dummy signal line are connected to the inverting input terminal and non-inverting input terminal of the charge amplifier respectively, the non-inverting terminal being grounded through a capacitor having a capacitance value which is equal to the feedback capacitance of the charge amplifier.

* * * * *